United States Patent
Maddali et al.

(10) Patent No.: US 7,583,046 B2
(45) Date of Patent: Sep. 1, 2009

(54) ROTOR POSITION DETECTION AT STANDSTILL AND LOW SPEEDS USING A LOW POWER PERMANENT MAGNET MACHINE

(75) Inventors: Vijay K Maddali, Rockford, IL (US); Albert L Markunas, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 254 days.

(21) Appl. No.: 11/820,640

(22) Filed: Jun. 20, 2007

(65) Prior Publication Data

US 2008/0315822 A1 Dec. 25, 2008

(51) Int. Cl.
*H02P 23/00* (2006.01)

(52) U.S. Cl. .................. 318/700; 318/704; 318/705; 318/715

(58) Field of Classification Search ............... 318/700, 318/704, 705, 710, 716–724
See application file for complete search history.

(56) References Cited

U.S. PATENT DOCUMENTS

| | | | |
|---|---|---|---|
| 6,646,409 B2 * | 11/2003 | Won et al. .................. 318/701 |
| 6,967,461 B1 | 11/2005 | Markunas et al. |
| 7,034,497 B2 | 4/2006 | Markunas et al. |
| 7,049,783 B2 * | 5/2006 | Yoshinaga et al. .......... 318/629 |
| 7,170,247 B2 * | 1/2007 | Yoshinaga et al. .......... 318/448 |
| 7,443,130 B2 * | 10/2008 | Takao et al. ................. 318/806 |
| 2003/0160583 A1 | 8/2003 | Patel |
| 2004/0232862 A1 | 11/2004 | Wogari et al. |

* cited by examiner

*Primary Examiner*—Bentsu Ro
*Assistant Examiner*—Thai Dinh
(74) *Attorney, Agent, or Firm*—Stephen G. Mican

(57) ABSTRACT

For a multiphase alternating current (AC) wound field synchronous machine (WFSM) that has a stator with a selected number of poles, the WFSM having an associated exciter and multiphase AC permanent magnet machine (PMM) directly coupled to the WFSM, a method of sensing the position of a rotor in the WFSM comprises the steps of: configuring a stator for the PMM to have a number of poles that is a sub-multiple of the selected number of WFSM stator poles; configuring a rotor for the PMM to have high saliency; applying multiphase AC power of a selected frequency to the PMM stator; detecting at least one set of stator harmonic currents of the multiphase AC power resulting from the rotor saliency; converting the detected PMM harmonic stator currents from their multiphase coordinates to $\alpha\beta$ coordinates; rotating the converted PMM stator currents into a reference frame for at least one selected harmonic to generate $\alpha\beta$ coordinate harmonic current vectors; and estimating the position of the WFSM rotor based on the values of the $\alpha\beta$ coordinate harmonic current vectors in the selected harmonic reference frame.

11 Claims, 1 Drawing Sheet

ROTOR POSITION DETECTION AT STANDSTILL AND LOW SPEEDS USING A LOW POWER PERMANENT MAGNET MACHINE

FIELD OF THE INVENTION

The invention relates to rotor angular position and velocity sensing systems for electromechanical power transfer systems, and more particularly to a position sensing system that resolves the position of a rotor for a wound field synchronous machine at or near standstill using a carrier injection sensorless position sensing system coupled to an associated permanent magnet machine.

BACKGROUND OF THE INVENTION

Electromechanical power transfer systems for aeronautical applications may integrate main and auxiliary engine start functions with onboard electric power generating equipment. A conventional brushless, wound field synchronous machine (WFSM) is ideal for such an electromechanical power transfer system wherein it may serve as both a starter and a generator. It is a logical choice for modern variable frequency (VF) alternating current (AC) electric system architectures. A WFSM that serves as both a starter and a generator is a representative of a class of variable speed motor drives in the start mode of operation that uses a solid-state power converter to process typically high potential direct current (DC) electric power into VF AC electric power suitable for driving the variable speed AC electric machine. Typical of all variable speed synchronous motor drives, the position of the motor rotor is required to control the solid-state power converter to meet motor performance requirements.

A resolver mounted to the starter/generator rotor may provide this required rotor position information, but it is an undesirable addition because of its imposing size, weight, and complexity or unreliability penalties. Thus, it is more desirable to achieve the electric start function in a self-sensing or sensorless manner, that is, without a resolver or other overt rotor position sensing means. Additionally, the sizing of a WFSM for such a starter/generator application is for worst case starting conditions that may require a plurality of machines to start a single main engine during cold day conditions. It is thus required in some applications to parallel a multiplicity of starter/generators to provide full rated torque from each of these starter/generators at standstill.

There are many sensorless schemes to enable sensorless operation of many different classes of electric motors under a variety of different operating conditions. At rotor standstill or low speed there is insufficient back electromotive force (EMF) generated in a dynamoelectric machine to enable an accurate estimate of rotor position using only passive measurement of terminal potentials and currents. It is therefore necessary to provide some means to stimulate the machine in order to extract rotor position information.

Either the rotor or the stator may receive such stimulation. It may be either transient or continuous, and it may be of different frequencies. All known approaches require some means to stimulate the machine and some means to interpret or demodulate the stimulation response in order to provide an estimate of the rotor position. Markunas et al., herein incorporated by reference, describe one advantageous approach in U.S. Pat. No. 7,034,097.

Markunas et al. describes a carrier injection sensorless (CIS) method of estimating the position and velocity of the rotor of a WFSM. CIS works by applying a high frequency excitation signal with an electrical current or potential rotating waveform to the dynamoelectric machine at a high enough frequency that it sweeps around the stator faster than the rotor is turning, thus "viewing" the rotor from all angles. This "viewing" is possible by measuring the resulting rotating current or potential waveform, which contains information about the rotor due to rotor position dependent differences in the equivalent magnetic circuit of the dynamoelectric machine.

By transforming the rotating current waveform at the machine terminals to its stationary two-axis equivalent ($\alpha\beta$) and x-y plotting the result, a non-circular orbit is observable that rotates with the rotor. This is the electromagnetic (EM) image of the dynamoelectric machine and in general, each machine design has its own unique EM image. This technique works with any dynamoelectric machine that has rotor saliencies that result in a change in impedance as seen at the stator windings to the high frequency excitation signal.

SUMMARY OF THE INVENTION

For a multiphase alternating current (AC) wound field synchronous machine (WFSM) that has a stator with a selected number of poles, the WFSM having an associated exciter and multiphase AC permanent magnet machine (PMM) directly coupled to the WFSM, the invention generally comprises a method of sensing the position of a rotor in the WFSM comprising the steps of: configuring a stator for the PMM to have a number of poles that is a sub-multiple of the selected number of WFSM stator poles; configuring a rotor for the PMM to have high saliency; applying multiphase AC power of a selected frequency to the PMM stator; detecting at least one set of stator harmonic currents of the multiphase AC power resulting from the rotor saliency; converting the detected PMM harmonic stator currents from their multiphase coordinates to $\alpha\beta$ coordinates; rotating the converted PMM stator currents into a reference frame for at least one selected harmonic to generate $\alpha\beta$ coordinate harmonic current vectors; and estimating the position of the WFSM rotor based on the values of the $\alpha\beta$ coordinate harmonic current vectors in the selected harmonic reference frame.

DETAILED DESCRIPTION OF THE INVENTION

Figure 1:
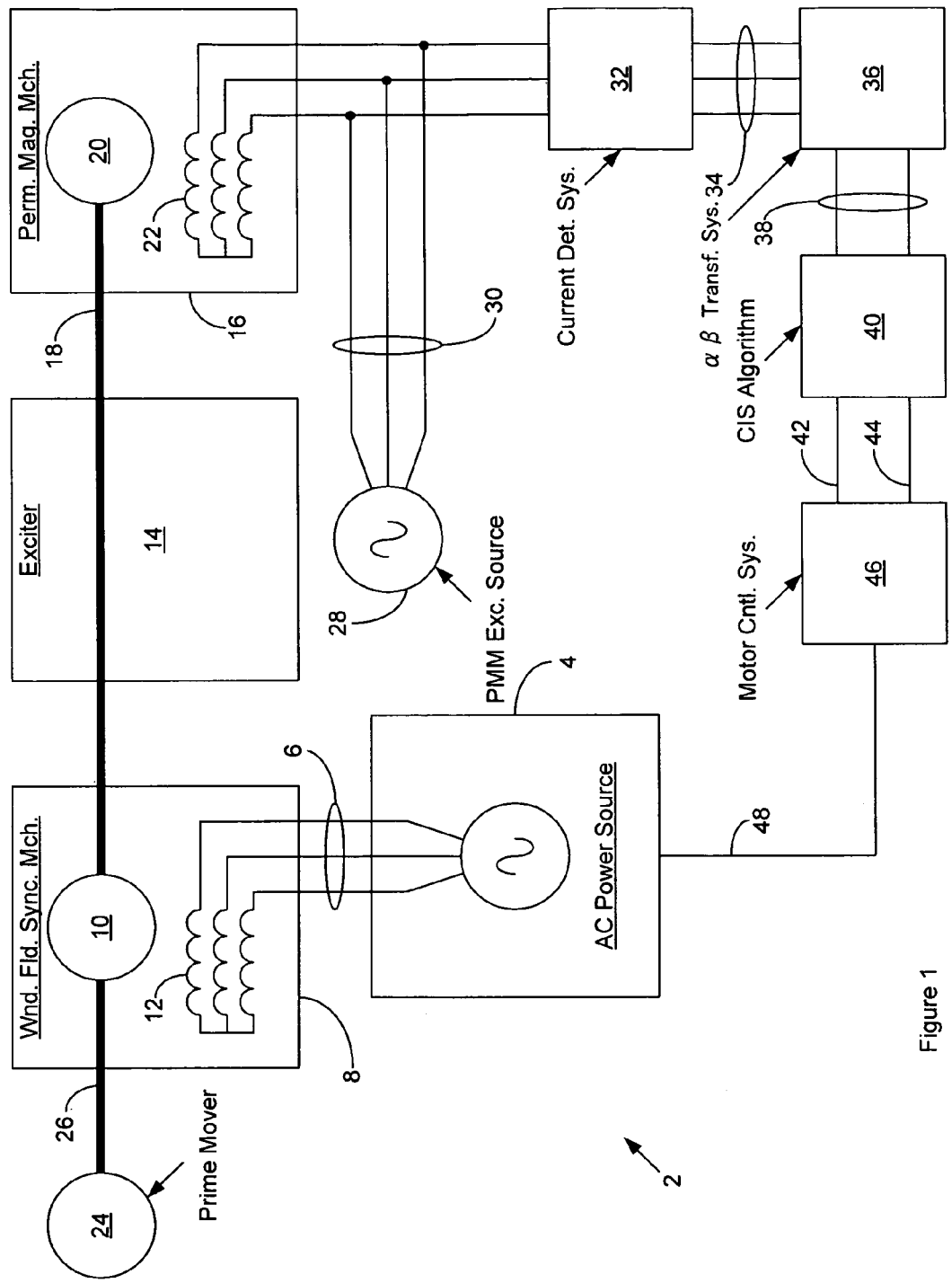
FIG. 1 is a high-level schematic of an electromechanical power transfer system 2 that may incorporate a possible embodiment of the invention.

FIG. 1 is a high-level schematic of an electromechanical power transfer system 2 that may incorporate a possible embodiment of the invention. A multiphase AC power source 4 couples to an AC main power bus 6. A WFSM 8 comprises a wound rotor 10 and a multiphase AC stator 12 with a selected number of poles. The stator 12 receives AC power from the power source 4 by way of the main bus 6. The power source 4, main bus 6 and stator 12 may have two or more phases, but they are typically three phase as shown in FIG. 1. The power source 4 will typically comprise an inverter output of a motor control system. The WFSM 8 has an associated exciter 14 and auxiliary permanent magnet machine (PMM) 16, both of which directly couple to the WFSM 8 by way of a coupling shaft 18. The PMM 16 comprises a permanent magnet (PM) rotor 20 and a multiphase AC stator 22 with the same number of phases as the WFSM stator 12 and a sub-multiple of the selected number of poles of the WFSM 12. The WFSM 8, the exciter 14 and the PMM 16 may conveniently comprise a single integrated assembly. A prime mover 24 couples to the WFSM 8 by way of a drive shaft 26 so that the WFSM 8 may rotate the prime mover 24 in a starting mode.

The PMM stator 22 receives AC excitation power from a PMM multiphase AC excitation source 28 that couples to the PMM stator 22 by way of a multiphase AC auxiliary bus 30. The frequency of excitation is not critical and may vary over a wide range, but a 400 Hz excitation source is conveniently available in most aeronautical applications. An auxiliary bus current detector system 32 detects stator currents in the auxiliary bus 30, including the fundamental excitation frequency f1$p$ currents $I_{f_1p}$ and harmonic stator currents of the excitation frequency due to the saliency of the PMM rotor 20 and its interaction with the PMM stator 22. These harmonic stator currents may include the negative first harmonic f1$n$ currents $I_{f_1n}$ and the positive second harmonic f2$p$ currents $I_{f_2p}$ and generates respective detected current signals on a detection system output bus 34.

A multiphase to αβ coordinate transformation system 36 receives the detected stator current signals from the detector system 32 by way of the detection system output bus 34 and generates respective αβ coordinate stator current signals on αβ coordinate transformation system output lines 38. A CIS algorithm 40 receives the αβ coordinate stator current signals on the αβ coordinate transformation system output lines 38. Typically using phase lock loop detection techniques, as outlined in Markunas et al., the CIS algorithm 40 will lock on to at least one of the αβ coordinate harmonic stator current signals and estimate the instantaneous position of the PMM rotor.

For instance, the CIS algorithm 40 may rotate the αβ coordinate harmonic stator current signals into the negative first harmonic rotating reference frame to extract corresponding rotating vector current components at −400 Hz. The theory of CIS position sensing states that a rotor EM image rotates with the rotor electrical angle. In this case, the rotating vector current components rotate in the same direction as the rotor EM image of the PMM rotor 20, but the angle increment is twice that of the rotor EM image. Because of this twice rotor electrical angle, the negative first harmonic current vector is not by itself usable to estimate unambiguously true rotor position, only pole position. Using this current vector, some other means must then establish true position.

U.S. Pat. No. 6,967,461 by Markunas et al., hereby incorporated by reference, describes one means to provide north-south discrimination. This patent indicates that positively rotating vector current components may be usable to overcome north-south ambiguity. Thus, the CIS algorithm 40 may rotate the αβ coordinate harmonic stator current signals into the positive second harmonic rotating reference frame to extract corresponding rotating vector current components at +800 Hz. The CIS algorithm may then use the positive second harmonic current vector to determine north-south polarity of the PMM rotor 20.

If the PMM rotor 20 has sufficient rotor saliency and the number of poles of the PMM stator 22 is the same as the number of poles of the WFSM stator 12, that is, a sub-multiple of 1, then CIS algorithm 40 may use the positive second harmonic current vector itself to unambiguously determine the position of the PMM rotor 20 and the WFSM rotor 10. It is possible to induce saliency in the PMM rotor 20 by geometric or magnetic saturation means. For instance, the design of the PMM rotor 20 may have a non-uniform geometry to induce geometric saliency in the PMM rotor 20. Alternatively, the application of a level of the PMM excitation source 28 to the PMM stator 22 that magnetically saturates the PMM 16 may induce saturation saliency in the PMM rotor 20.

The CIS algorithm 40 may provide an estimated rotor angular position signal on a rotor angular position line 42 and an estimated rotor angular velocity signal on a rotor angular velocity line 44 for the WFSM rotor 10. A motor control system 46 may receive the estimated rotor angular position signal on the rotor angular position line 42 and the estimated rotor angular velocity signal on the rotor angular velocity line 44 to generate appropriate controller output signals on a controller output bus 48. The power source 4 may receive the controller output signals on the controller output bus 48 to regulate power and angular velocity of the WFSM 8 during a starting operation.

The described embodiments of the invention are only some illustrative implementations of the invention wherein changes and substitutions of the various parts and arrangement thereof are within the scope of the invention as set forth in the attached claims.

The claimed invention is:

1. For a multiphase alternating current (AC) wound field synchronous machine (WFSM) that has a stator with a selected number of poles, the WFSM having an associated exciter and multiphase AC permanent magnet machine (PMM) directly coupled to the WFSM, a method of sensing the position of a rotor in the WFSM comprising the steps of:
configuring a stator for the PMM to have a number of poles that is a sub-multiple of the selected number of WFSM stator poles;
inducing saliency in a rotor for the PMM;
applying multiphase AC power of a selected frequency to the PMM stator;
detecting at least one set of stator harmonic currents of the multiphase AC power resulting from the rotor saliency;
converting the detected PMM harmonic stator currents from their multiphase coordinates to αβ coordinates;
rotating the converted PMM stator currents into a reference frame for at least one selected harmonic to generate αβ coordinate harmonic current vectors; and
estimating the position of the WFSM rotor based on the values of the αβ coordinate harmonic current vectors in the selected harmonic reference frame.

2. The method of claim 1, wherein the step of detecting comprises detecting the negative first harmonic of the multiphase AC power frequency.

3. The method of claim 2, wherein the step of detecting further comprises detecting the positive second harmonic of the multiphase AC power frequency and the method further comprises the step of estimating north-south polarity of the WFSM rotor with αβ coordinate positive second harmonic current vectors.

4. The method of claim 3, wherein the step of estimating the position of the WFSM rotor is based on the values of the αβ coordinate negative first harmonic current vectors.

5. The method of claim 1, wherein the step of inducing saliency in the PMM rotor comprises designing the PMM rotor to have non-uniform geometry to induce geometric saliency in the PMM rotor.

6. The method of claim 5, wherein the step of detecting further comprises detecting the positive second harmonic of the multiphase AC power frequency.

7. The method of claim 6, wherein the step of estimating the position of the WFSM rotor is based on the values of the αβ coordinate positive second harmonic current vectors.

8. For a multiphase alternating current (AC) wound field synchronous machine (WFSM) that has a stator with a selected number of poles, the WFSM having an associated exciter and multiphase AC permanent magnet machine (PMM) directly coupled to the WFSM, a method of sensing the position of a rotor in the WFSM comprising the steps of:

configuring a stator for the PMM to have a number of poles that is a sub-multiple of the selected number of WFSM stator poles;

inducing geometric saliency in a rotor for the PMM;

applying multiphase AC power of a selected frequency to the PMM stator;

detecting the negative first harmonic and the positive second harmonic stator currents of the multiphase AC power frequency;

converting the detected PMM negative first harmonic and the positive second harmonic stator currents from their multiphase coordinates to αβ coordinates;

rotating the converted PMM negative first harmonic and the positive second stator currents into their respective reference frames to generate respective αβ coordinate harmonic current vectors;

estimating north-south polarity of the WFSM rotor with the αβ coordinate positive second harmonic current vectors and estimating the polarity-determined position of the WFSM rotor based on the values of the negative first harmonic αβ coordinate harmonic current vectors.

9. The method of claim 8, wherein the step of inducing geometric saliency in the PMM rotor comprises designing the PMM rotor to have non-uniform geometry.

10. For a multiphase alternating current (AC) wound field synchronous machine (WFSM) that has a stator with a selected number of poles, the WFSM having an associated exciter and multiphase AC permanent magnet machine (PMM) directly coupled to the WFSM, a method of sensing the position of a rotor in the WFSM comprising the steps of:

configuring a stator for the PMM to have a number of poles that is a sub-multiple of the selected number of WFSM stator poles;

inducing saturation saliency in a rotor for the PMM;

applying multiphase AC power of a selected frequency to the PMM stator;

detecting at least the positive second harmonic stator currents of the multiphase AC power resulting from the rotor saliency;

converting the detected PMM positive second harmonic stator currents from their multiphase coordinates to αβ coordinates;

rotating the converted PMM positive second harmonic stator currents into their reference frame to generate αβ coordinate positive second harmonic current vectors; and estimating the position of the WFSM rotor based on the values of the αβ coordinate positive second harmonic current vectors.

11. The method of claim 10, wherein the step of inducing saturation saliency in the PMM rotor comprises adjusting the AC power to a level that saturates the PMM rotor.

* * * * *